(12) United States Patent  
Bjontegard et al.

(10) Patent No.: US 8,996,753 B2
(45) Date of Patent: Mar. 31, 2015

(54) MOBILE DEVICE PERIPHERAL DEVICE LOCATION AND CONNECTION

(75) Inventors: Bernt Erik Bjontegard, San Diego, CA (US); Miles Alexander Lyell Kirby, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 13/269,514

(22) Filed: Oct. 7, 2011

(65) Prior Publication Data
US 2013/0091309 A1    Apr. 11, 2013

(51) Int. Cl.
G06F 3/00     (2006.01)
H04W 4/00     (2009.01)
H04W 4/04     (2009.01)
H04W 4/20     (2009.01)

(52) U.S. Cl.
CPC ............. *H04W 4/008* (2013.01); *H04W 4/001* (2013.01); *H04W 4/04* (2013.01); *H04W 4/20* (2013.01)
USPC .......................................................... 710/16

(58) Field of Classification Search
None
See application file for complete search history.

(56) References Cited

U.S. PATENT DOCUMENTS

| | | | |
|---|---|---|---|
| 7,377,835 B2 | 5/2008 | Parkulo et al. | |
| 7,483,964 B1* | 1/2009 | Jackson et al. | 709/221 |
| 7,936,872 B2 | 5/2011 | Krumm et al. | |
| 8,544,054 B2* | 9/2013 | Reams et al. | 725/133 |
| 2002/0184304 A1 | 12/2002 | Meade et al. | |
| 2007/0249331 A1 | 10/2007 | Sinivaara et al. | |
| 2008/0247369 A1 | 10/2008 | Sethi et al. | |
| 2009/0254975 A1 | 10/2009 | Turnbull et al. | |
| 2009/0265775 A1 | 10/2009 | Wisely et al. | |
| 2009/0273801 A1* | 11/2009 | Steele et al. | 358/1.15 |
| 2010/0109864 A1* | 5/2010 | Haartsen et al. | 340/539.13 |
| 2010/0159943 A1* | 6/2010 | Salmon | 455/456.1 |
| 2011/0172904 A1* | 7/2011 | Dayaratne | 701/201 |
| 2011/0172916 A1 | 7/2011 | Pakzad et al. | |

OTHER PUBLICATIONS

International Search Report and Written Opinion—PCT/US2012/054687—ISA/EPO—Feb. 22, 2013.

* cited by examiner

*Primary Examiner* — Elias Mamo
(74) *Attorney, Agent, or Firm* — Berkeley Law & Technology Group, LLP

(57) ABSTRACT

A mobile device may desire to connect wirelessly to a proximate peripheral device, such as a printer, projector, or other device. The mobile device may choose from proximate peripheral devices based on a number of factors including proximity, type, or configuration. Proximity may be determined based on received signal strength, access point profile, or other technique. Certain non-proximate devices may be desired based on certain conditions, including indoor location of a mobile device, compatibility of the mobile device, etc.

26 Claims, 6 Drawing Sheets

MOBILE DEVICE PERIPHERAL DEVICE LOCATION AND CONNECTION

TECHNICAL FIELD

The present description is related, generally, to position location and, more particularly, to, peripheral device location and connection by mobile devices.

BACKGROUND

A number of devices exist to provide location information indicating the location of a device. Different methods may be used by such systems to determine a device's location. For example, positioning methods can determine a location of a target device from measurements by the target device of known external signal sources, such as global positioning system (GPS) satellites or wireless communication network base stations. These measurements may enable the current absolute location of the target device to be obtained, for example its precise latitude, longitude and altitude.

If a target device is unable to measure signals from external sources, and network entities are unable to measure enough signals from the target device, it may not be possible to obtain the location of the target device, and/or to obtain the location within a required response time. Such cases may occur when there are physical obstructions between the target device and the external signal sources and/or network entities, for example, when a target device is inside a building or tunnel, outside in a dense urban environment, or very distant from terrestrial external radio sources and network entities.

When a location of a mobile device is known, that location may be used to locate nearby peripheral devices. In indoor environments in particular, a mobile device may desire to locate nearby peripheral devices that may be used by the mobile device, such as printers, projection screens, etc. Improved techniques are desired for identifying and communicating with such peripheral devices.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

SUMMARY

Figure 1:
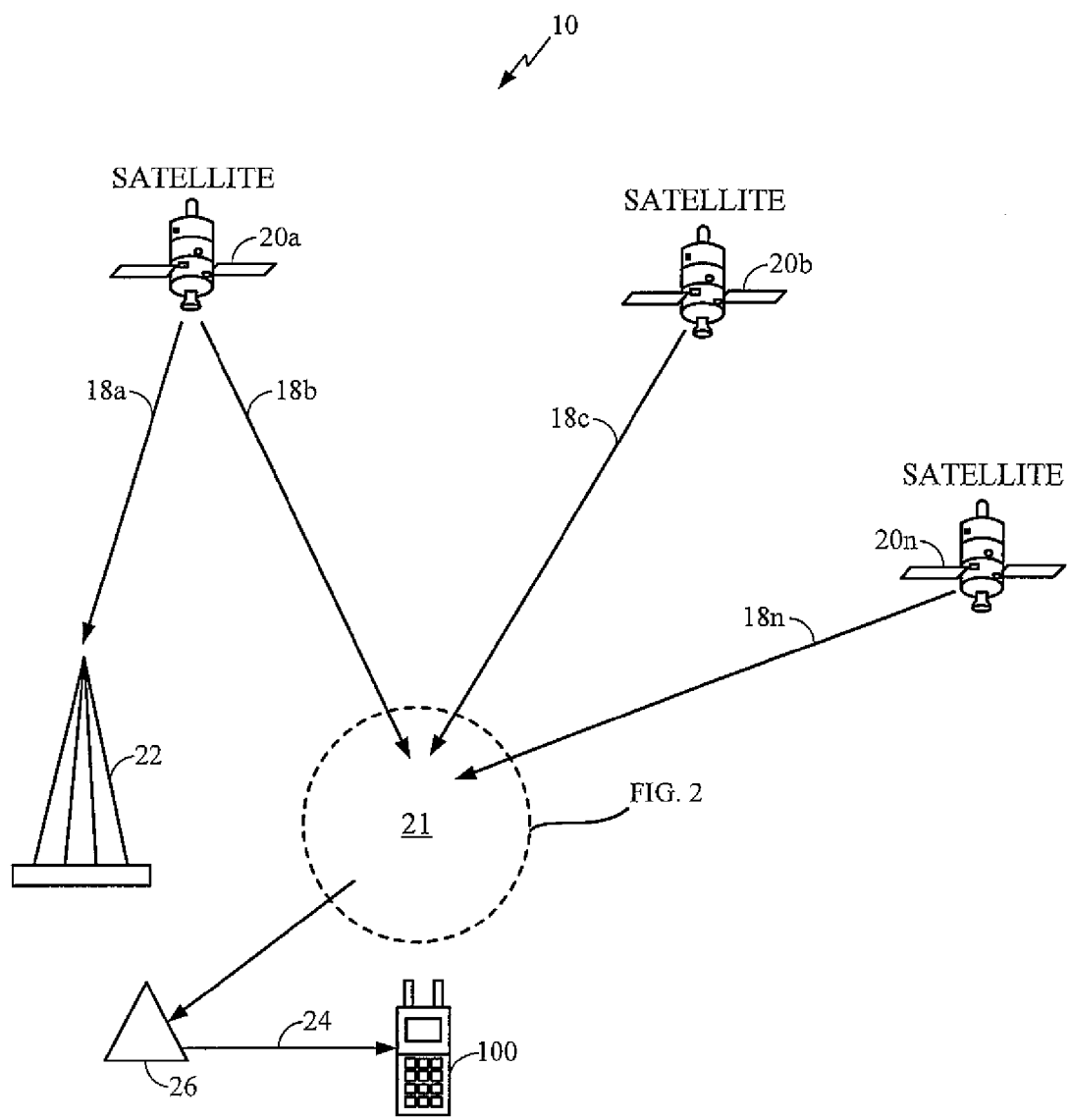
FIG. 1 is a block diagram conceptually illustrating a system for peripheral device location and connection by mobile devices.

Offered is a method of identifying peripheral devices to a mobile device. The method includes determining mobile device location information. The method also includes receiving peripheral device location information and peripheral device capabilities information. The method also includes comparing the peripheral device capabilities information to desired capabilities. The method further includes comparing the peripheral device location information to the mobile device location information. The method still further includes determining when the peripheral device location is desired. The method also includes selecting a peripheral device(s).

Offered is an apparatus for identifying peripheral devices to a mobile device. The apparatus includes means for determining mobile device location information. The apparatus also includes means for receiving peripheral device location information and peripheral device capabilities information. The apparatus also includes means for comparing the peripheral device capabilities information to desired capabilities. The apparatus further includes means for comparing the peripheral device location information to the mobile device location information. The apparatus still further includes means for determining when the peripheral device location is desired. The apparatus also includes means for selecting a peripheral device(s).

Offered is a computer program product for identifying peripheral devices to a mobile device. The computer program product includes a non-transitory computer-readable medium having program code recorded thereon. The program code includes program code to determine mobile device location information. The program code also includes program code to receive peripheral device location information and peripheral device capabilities information. The program code also includes program code to compare the peripheral device capabilities information to desired capabilities. The program code further includes program code to compare the peripheral device location information to the mobile device location information. The program code still further includes program code to determine when the peripheral device location is desired. The program code also includes program code to select at least one peripheral device.

Offered is an apparatus for identifying peripheral devices to a mobile device. The apparatus includes a processor(s) and a memory coupled to the processor(s). The processor(s) is configured to determine mobile device location information. The processor(s) is also configured to receive peripheral device location information and peripheral device capabilities information. The processor(s) is also configured to compare the peripheral device capabilities information to desired capabilities. The processor(s) is further configured to compare the peripheral device location information to the mobile device location information. The processor(s) is still further configured to determine when the peripheral device location is desired. The processor(s) is also configured to select at least one peripheral device.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Various aspects of the disclosure provide techniques to techniques for peripheral device location and connection by mobile devices techniques.

An example system for location determination is illustrated in FIG. 1. Position location signals 18a-n are transmitted from one or more satellites 20a-n. The position location signals 18a-n transmitted from one or more satellites 20a-n may be received by a Wide Area Reference Network (WARN) 21 and a first base station, or eNodeB 22. The WARN 21 forwards the satellite information to a location server 26, which transmits one or more position location signals 24 to any number of receivers and/or transceivers and/or servers and/or terminals, including the handset or mobile device 100 that has been activated to communicate with the base station 22 across a mobile wireless communications system, and whose user is seeking to establish a position location using satellite position system (SPS) technology included in the mobile device 100. Location related data, such as assistance data and location measurement data, may be transmitted between a mobile device 100 and the location server 26.

Figure 2:
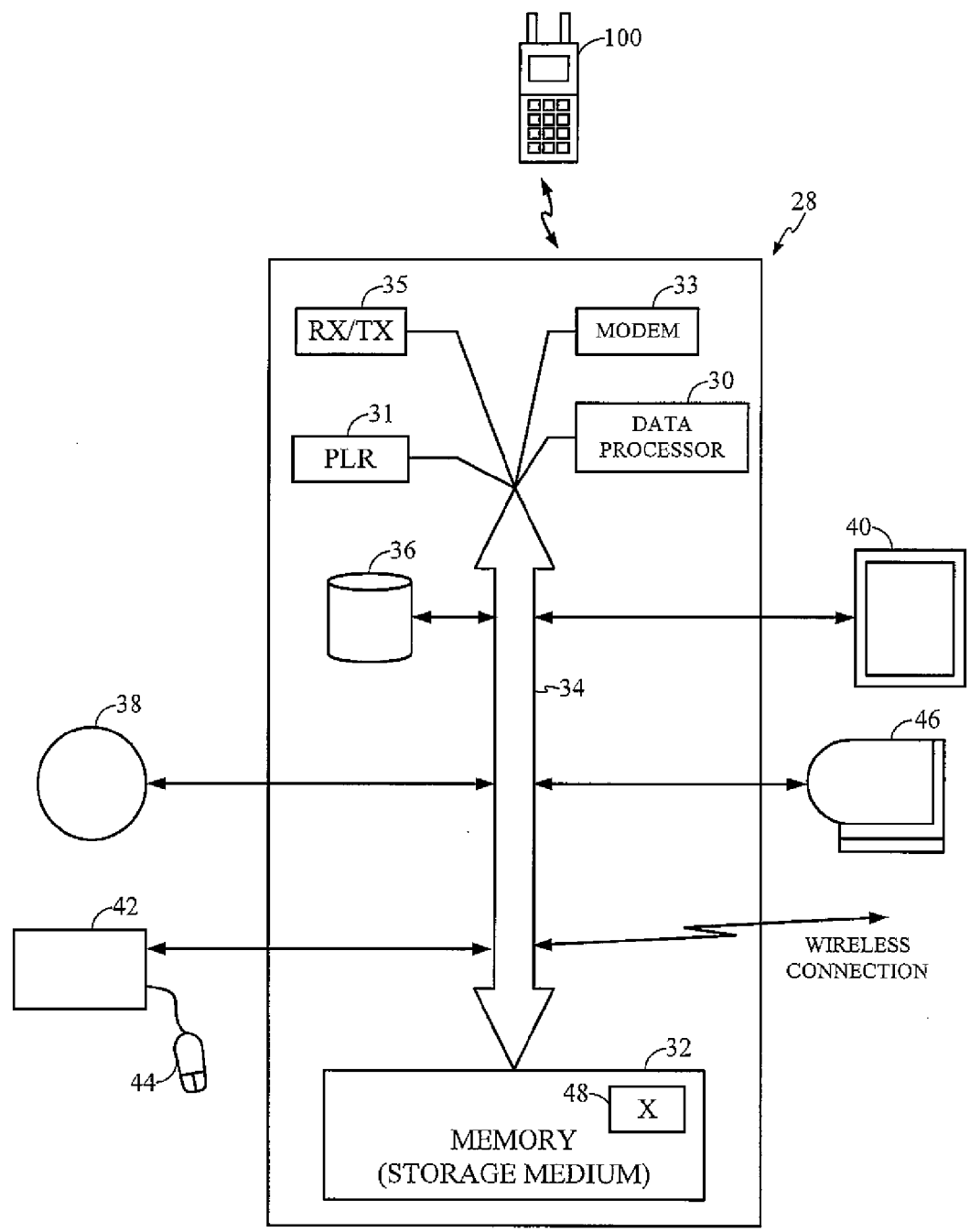
FIG. 2 is a block diagram conceptually illustrating a system for peripheral device location and connection by mobile devices.

FIG. 2 illustrates, by cross-reference with FIG. 1, that the mobile device 100 includes at least one computer processing system 28. As shown, the computer processing system 28 is operatively connected to the mobile device 100. In one aspect, the computer processing system 28 is housed in the mobile device 100. The computer processing system 28 is adapted to receive, store, process, and execute instructions at least in connection with location position data.

The computer processing system 28 of the mobile device 100 is illustrated in the block diagram of FIG. 2. As shown, the computer processing system 28 may include a variety of components to enable the mobile device 100 to receive, process, store, and execute instructions in connection with data and information about position location data, including position signals 18a-n (FIG. 1), and base station position location signal 24 (FIG. 1) that includes position location data. The components may include a data processor 30, a position location receiver (e.g., a GPS receiver) 31, a storage medium 32, a wireless modem 33, and a cellular transceiver 35, all coupled by a bus 34. The storage medium 32 is a machine- or computer-readable medium and may include but is not limited to volatile memories such as DRAM, and SRAM, as well as non-volatile memories such as ROM, FLASH, EPROM, EEPROM and bubble memory.

Also capable of being connected to the bus are optional secondary storage 36, external storage 38, output devices such as a screen 40 that may be included with the mobile device 100 and, in optional configurations, an input device such as a keyboard 42, a mouse 44, and a peripheral device 46, such as a printer, projector, etc. Secondary storage 36 may include machine-readable media such as, but not limited to, a hard disk drive, a magnetic drum, and a bubble memory. External storage 38 may include machine-readable media such as a floppy disk, a removable hard drive, a magnetic tape, CD-ROM, removable memory cards, and even other computers connected via a communications line. The distinction between secondary storage 36 and external storage 38 is primarily for convenience in describing the use of machine readable memory. As such, a person skilled in the art will appreciate that there is substantial functional overlap between and among the components. Computer software and user programs can be stored in software storage medium 32 and external storage 38. Executable versions of computer software can be read from storage medium 32 such as non-volatile storage medium, loaded for execution directly into volatile storage medium, executed directly out of non-volatile storage medium, or stored on the secondary storage prior to loading into volatile storage medium for execution.

The computer processing system 28 illustrated in FIG. 2 of the mobile device 100 includes a set of computer instructions (in this document, "instructions") for implementing the methods described in this document. The instructions 48 are illustrated in FIG. 2 diagrammatically solely as an aid in understanding the methods described in this document. The instructions may be stored in various internal memory or may be implemented in hardware. The instructions may also be included in a computer processing system of a computer located external to the mobile device 100, for example, on a secured intranet, on the Internet, or at a base station 22 or location server 26, from which they may be transmitted to mobile device 100. Data associated with the instructions may be received, stored, processed and transmitted to mobile devices 100, but only a single mobile device is illustrated to enhance clarity. Data associated with the instructions also may be received, stored, processed and transmitted to/from a plurality of base stations 22 or location servers 26, but only a single base station 22 and location server 26 is illustrated in FIG. 1 to enhance clarity. Alternately, data associated with the instructions also may be received, stored, processed and transmitted to/from a computer server connected to a network.

Figure 3:
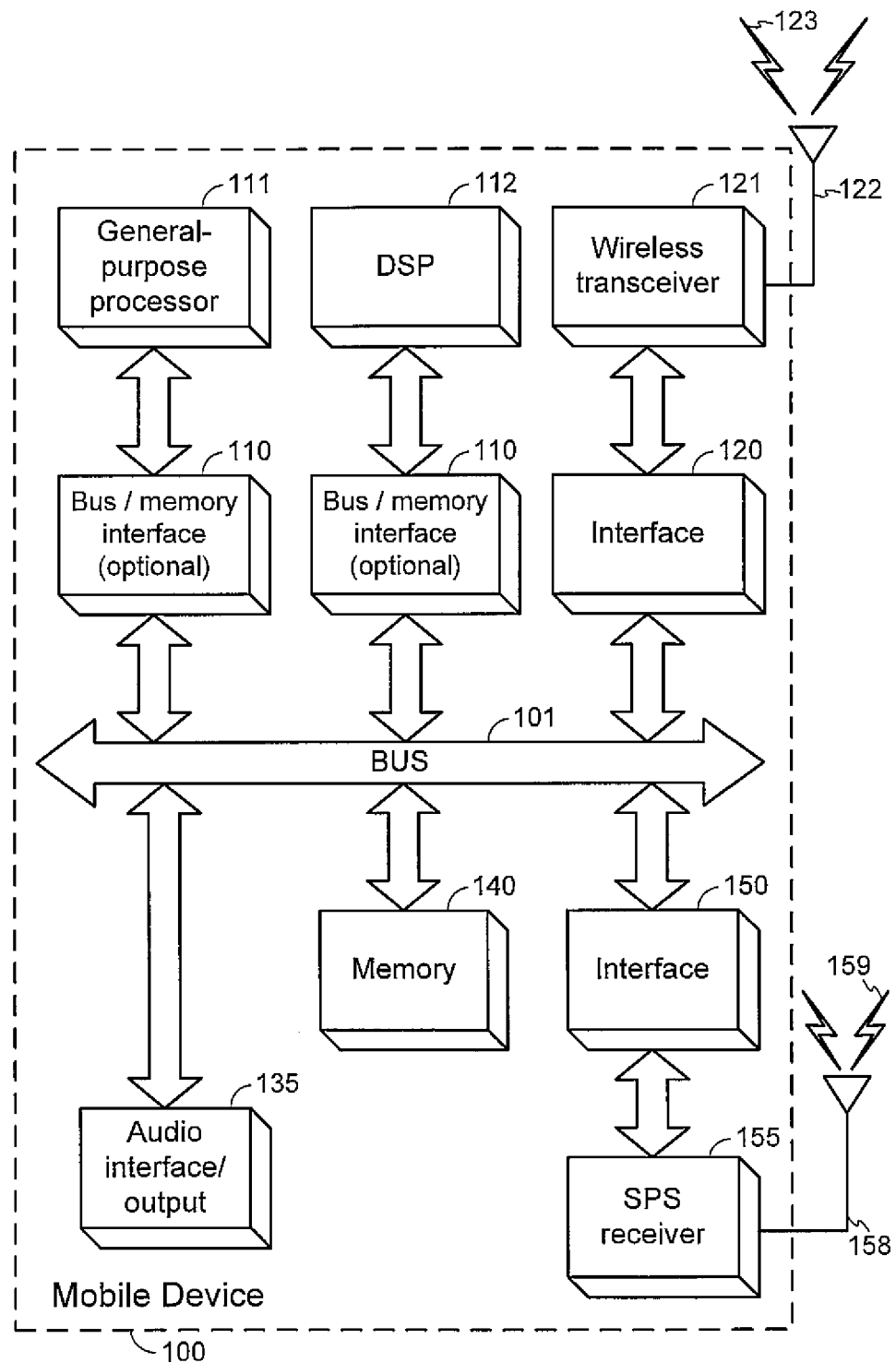
FIG. 3 shows a schematic block diagram illustrating an exemplary mobile device capable of receiving Internet radio, broadcast radio and satellite positioning system (SPS) signals, according to one aspect of the present disclosure.

In certain implementations a mobile device may be implemented as shown in FIG. 3. As illustrated in FIG. 3, a mobile device 100 may contain a wireless transceiver 121 which is capable of sending and receiving wireless signals 123 via a wireless antenna 122 over a wireless network and connected to a bus 101 by a wireless transceiver bus interface 120. The wireless transceiver bus interface 120 may, in some embodiments be a part of the wireless transceiver 121. Some embodiments may have multiple wireless transceivers 121 and wireless antennas 122 to support multiple standards such as WLAN, CDMA, WCDMA, LTE, and Bluetooth.

Also illustrated in FIG. 3, certain aspects of mobile device 100 may contain a Satellite Positioning System (SPS) receiver 155 capable of receiving Satellite Positioning System (SPS) signals 159 via SPS antenna 158. SPS receiver 155 may also process, in whole or in part, the Satellite Positioning System (SPS) signals 159 and use the SPS signals 159 to determine the location of the mobile device. In some embodiments, general-purpose processor(s) 111, memory 140, DSP(s) 112 and specialized processors (not shown) may also be utilized to process the SPS signals 159, in whole or in part, and/or calculate the location of the mobile device 100, in conjunction with SPS receiver 155. The storage of SPS or other location signals may be done in memory 140 or registers.

Also shown in FIG. 3, mobile device 100 may contain DSP(s) 112 connected to the bus 101 by a bus interface 110, general-purpose processor(s) 111 connected to the bus 101 by a bus interface 110 and memory 140, also sometimes connected to the bus by a bus interface 110. The bus interfaces 110 may be integrated with the DSP(s) 112, general-purpose processor(s) 111 and memory 140 with which they are associated. In various embodiments, functions may be stored as one or more instructions or code in memory 140 such as on a computer-readable storage medium, such as RAM, ROM, FLASH, or disc drive, and executed by general-purpose processor(s) 111, specialized processors, or DSP(s) 112. Memory 140 is a processor-readable memory and/or a computer-readable memory that stores software code (programming code, instructions, etc.) configured to cause the processor(s) 111 and/or DSP(s) 112 to perform functions described.

In other aspects, functions may be performed in hardware.

Also shown in FIG. 3, audio interface/output 135 is included in mobile device 100 to audible sound to enable transmission of the audible sound to the user through either embedded audio output components or through the wireless transceiver 121 to external audio peripheral devices.

Figure 4:
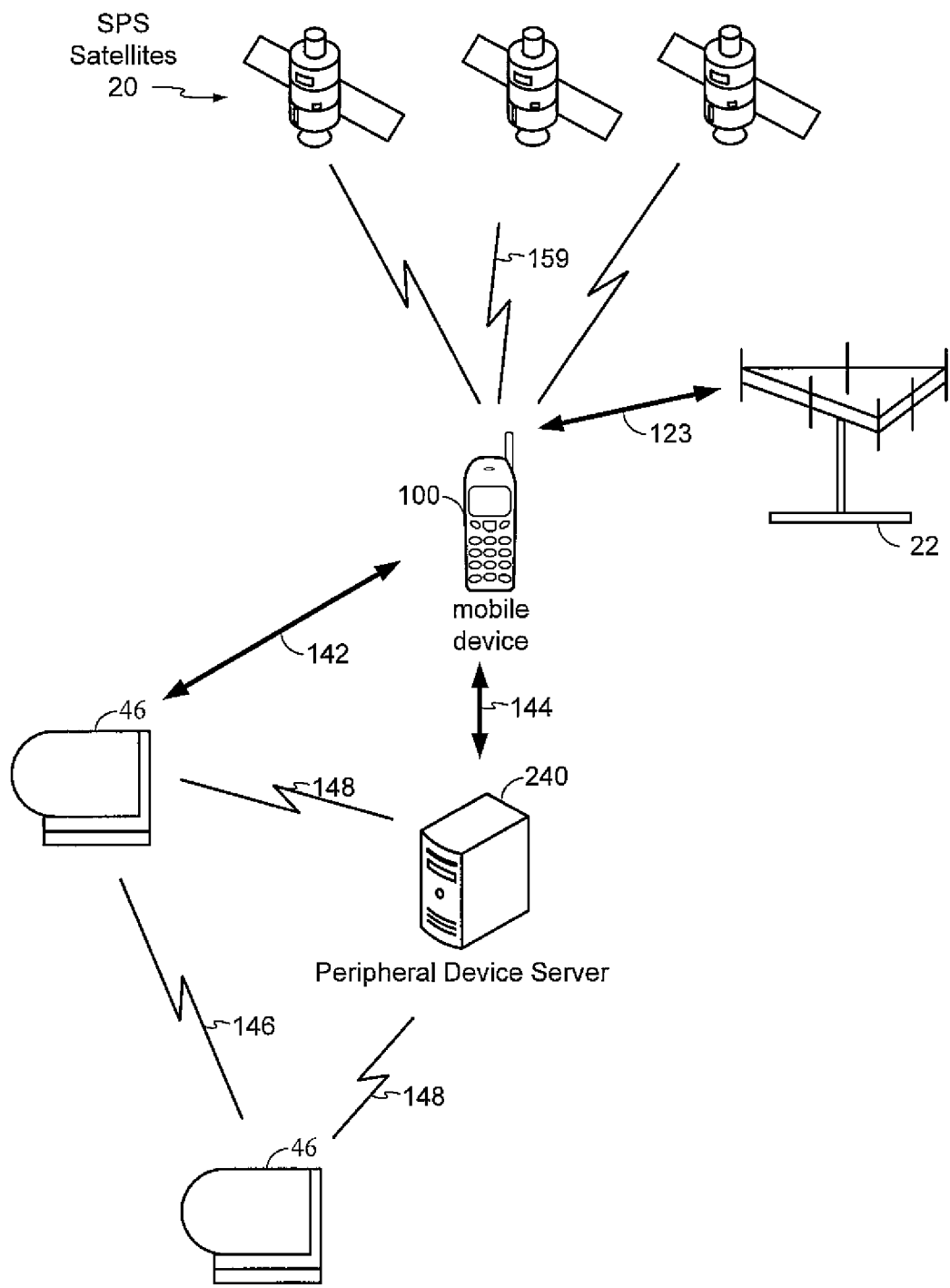
FIG. 4 shows a system diagram illustrating certain features of a system containing a mobile device capable of transitioning between an Internet radio signal communicated over wireless signals and a broadcast radio signal, according to one aspect of the present disclosure.

In certain implementations, as shown in FIG. 4, a mobile device 100 may receive SPS signals 159 from SPS Satellites 20. In some embodiments, the SPS Satellites may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. A mobile device may also communicate with a wireless network base station 22 via wireless signals 123.

A mobile device 100 may also communicate with peripheral devices 46 over a wireless connection 142. The mobile device may also communicate with a peripheral device server 240 over a wireless connection 144. The peripheral device server 240 may communicate with peripheral devices 46 over a connection 148 which may be wired or wireless. The peripheral devices 46 may communicate with each other over a connection 146 which may be wired or wireless. The peripheral devices 46 and/or peripheral device server 240 may store location information for the peripheral devices as well as configuration/capability information for the peripheral devices, peripheral/mobile device connection history, and other information described below.

In certain situations it may be desirable for a user of a mobile device to connect the mobile device to peripheral devices that are located near the mobile devices. Those peripheral devices may be nearby equipment. The mobile device may wish to connect to the equipment, for example to output content (such as projectors in conference rooms, televisions, speakers, etc.), or to input content (such as microphones, scanners, cameras, etc.), or may wish to simply locate the equipment for other purposes (such as an ATM, a electronic device indicating the location of a restroom, etc.).

The peripheral equipment may be visible or may be hidden (for example, a recessed projector). Offered is an improved method of locating and connecting to such peripheral devices with a mobile device by comparing the mobile device's location with the location of peripheral devices and determining which devices are proximate to the mobile device.

As described below a mobile device may be a laptop, tablet computer, smartphone, or other electronic device. A peripheral device may be any equipment that the mobile device wishes to locate such as a projector, a television, speakers, a microphones, a scanner, a camera, ATM, electronic tag indicating a location (e.g. a restroom, restaurant, etc.) or other device. Detection by a mobile device may be divided into two phases, Positioning and Discovery, though the two phases may overlap in certain respects. Once a desired peripheral device is identified, the mobile device may connect to the peripheral device.

Positioning

A mobile device may determine its location using a location detecting algorithm. Outdoors, a geo-locator system, such as the global positioning system (GPS) or other method may be used. Indoors, an indoor positioning algorithm such as Qualcomm's InNav may be used. Further positioning location may be accomplished using other techniques such as a Wi-Fi Access Point (AP). Each AP broadcasts beacon frames containing a service set identifier (SSID) and media access control (MAC) ID. The mobile device may estimate its distance from the AP using ranging and trilateration techniques. The mobile device may also identify a position profile by determining which access points it can see.

Discovery

A mobile device may then use several techniques to determine nearby equipment. In a beacon based technique equipment may transmit periodic beacons with positioning information. That positioning information may be coordinates (such as in a geo-locator or indoor navigation system) or other location information.

Another discovery technique may employ proximity detection based on signals received from the peripheral devices. For example, a mobile device may judge its proximity to peripheral devices through the strength of a received signal from the peripheral devices. In certain instances, however, using received signal strength may not identify the most desirable peripheral as a mobile device may be physically closer to one peripheral but may desire to connect to a different peripheral. For example, a mobile device wishing to connect to a certain projector may be physically closer to a projector in a different room but may wish to connect to a projector in the same room as the mobile device. In such instances other techniques may be employed to identify a desired peripheral. For example, in another embodiment, the mobile device utilizes map information regarding barriers and traversable areas such as walls, room boundaries, and hallways in conjunction with location information to determine whether a peripheral is in the same room or otherwise desired. Whether the mobile device and the peripheral are in the same enclosed area may be determined by comparing a location transmitted by the peripheral to the mobile device location. In another embodiment, whether the mobile device and the peripheral are in the same enclosed area may be decided by determining if the location of both the mobile device and the location of the peripheral are within the confines of the same enclosed area. In still another embodiment, the user may manually a selection of a given peripheral to the mobile device, for example, if more than one peripheral is desired. In some embodiments, if the mobile device is in a non-enclosed area such as a hallway, the peripheral may be chosen partly based on traversed distance to the peripheral rather than by direct line distance. Traversed distance may be significantly different in indoor venues that contain a network of hallways that generally prevent traversing directly to a peripheral. The traversed distance may also be chosen based on the most likely path or the path of most interest to the user based on prior stated interests and preferences.

Another discovery technique may employ a central repository or server which contains location information for peripheral devices. The mobile device may query the central repository, provide its own location, and request location information for peripheral devices. Peripheral device information may be queried in a number of ways (including by proximity to the mobile device, by other location metrics, by peripheral device type, by operational capabilities, etc.). Peripheral device information may also include, in some embodiments, state and/or capabilities information such as the operational status of a device, the length of queue (such as a print queue for a printer), the likely timeliness of service or the average pending service time, and/or the degree of availability of a device. Peripheral device location information may also include directional information relative to the location of the mobile device. In some embodiments the mobile device may provide an indication of the direction of the peripheral, for example, through an arrow on the screen. In such embodiments, the orientation of the mobile device may be obtained by various means such as accelerometers, gyros, and magnetometers.

Another discovery technique may identify to the mobile device peripheral devices which share the same access point as the mobile device, thus suggesting proximity. In another aspect a discovery technique may identify to the mobile device peripheral devices which share an access point profile. For example, if a user is in a room with a projector, and wishes to identify that projector with a mobile device, the mobile device may perform a discovery query. The mobile device, which can see access points A, B, and C may be given the choice between several projectors, a first which sees access points B, C, and D, a second which sees access points A, B, and C, and a third which sees access points A, B, and Z. The mobile device may select the second projector because that projector shares the same access point profile as the mobile device, and therefore is most likely to be the nearest projector to the device.

In one aspect, a mobile device, peripheral device, or other device such as the central repository, back-end server, or other information storage device, may maintain a record of connections between mobile devices and peripheral devices. This record/connection history may be use to assist future connection operations based on connection experiences of preceding mobile devices. For example, a mobile device with similar connection information to previous mobile device(s) may be shown available peripheral devices in an order formatted to reflect selected peripheral devices by the previous mobile device(s). The connection history may also include information such as failed connection attempts, frequently desired peripheral types by location (and/or by date, mobile device type, or other factors).

As part of either positioning or discovery, a mobile device's position location may based on discoverable peripheral devices, whose positions typically do not change. A mobile device may estimate its location based on peripherals which the mobile device can communicate with and location information obtained from those peripherals. Peripherals may know their own location from a number of techniques such as stored location coordinates, room/floor location, server identified quadrant information, etc. A digital map or floor plan may also be stored by one or more peripherals or by a server or other device and used to determine location information of a peripheral or mobile device and communicate that information to the mobile device. Additional location information, such as location within a particular room or corridor, direction the peripheral is pointing (particularly for such peripherals as projection devices, etc.) may also be included. Additional non-position location information may also be exchanged between a peripheral and a mobile device including compatible software information, power usage information, etc.

Connection

Once a desired peripheral device is identified, the mobile device may connect to that device by any of a variety of communication techniques including WLAN, Bluetooth, etc.

The above techniques may be combined and/or automated in a variety of ways to enhance a user experience.

For example, a user of a mobile device may be presented with a choice of proximate peripheral devices by type, distance, etc. A user may also be presented with a choice of proximate peripheral devices based on the mobile device configuration. For example, a user listening to audio content may be presented with the option of outputting the audio to speakers upon entering a room where the speakers are located. In another example, a user watching video content may be presented with the option of outputting to a nearby television set or video projector.

Alternatively, a user may perform a query for available peripheral devices. A user may initiate a query from a mobile device, which may then search or broadcast a request for nearby devices or may query a central repository to search for available peripheral devices. For example, a user in a conference room may wish to output video content to a projector in the room, or may wish to identify if any projectors are nearby. The mobile device may make a central query or search for nearby beacons. In another example, a user enters a shopping mall and wishes to locate the nearest ATM or restroom. The user may operate a mobile device to search for an electronic indicator indicating (which may be located on or near the ATM or restroom) the location of the desired item.

If multiple items in the desired category are available, they may be presented to the user in order of proximity. In other embodiments, the order of priority may be user determined. In still other embodiments, the order or priority may be based on predetermined criteria. For example, when searching for an ATM, both proximity, support for the user's desired bank network, and/or fees charged may be taken into account.

The above techniques may be employed by a mobile device, or they may be employed by a peripheral device, server, or other apparatus configured to identify peripheral devices to a mobile device.

Figure 5:
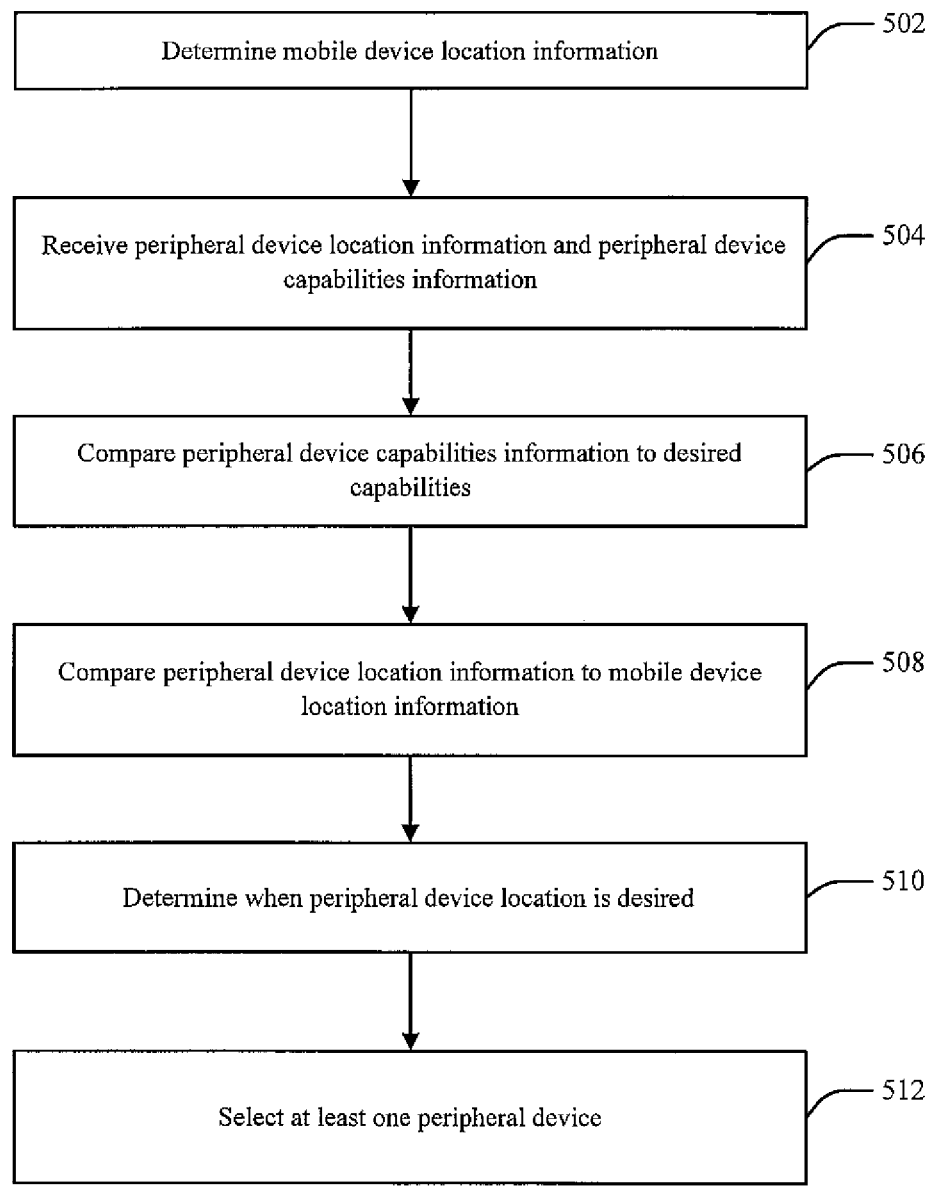
FIG. 5 shows a flow diagram illustrating a system for peripheral device location and connection by mobile devices according to one aspect of the present disclosure.

As shown in FIG. 5, an apparatus may determine mobile device location information, as shown in block 502. The apparatus may receive peripheral device location information and peripheral device capabilities information, as shown in block 504. The apparatus may compare the peripheral device capabilities information to desired capabilities, as shown in block 506. The apparatus may compare the peripheral device location information to the mobile device location information, as shown in block 508. The apparatus may determine when the peripheral device location is desired, as shown in block 510. The apparatus may select at least one peripheral device, as shown in block 512.

Figure 6:
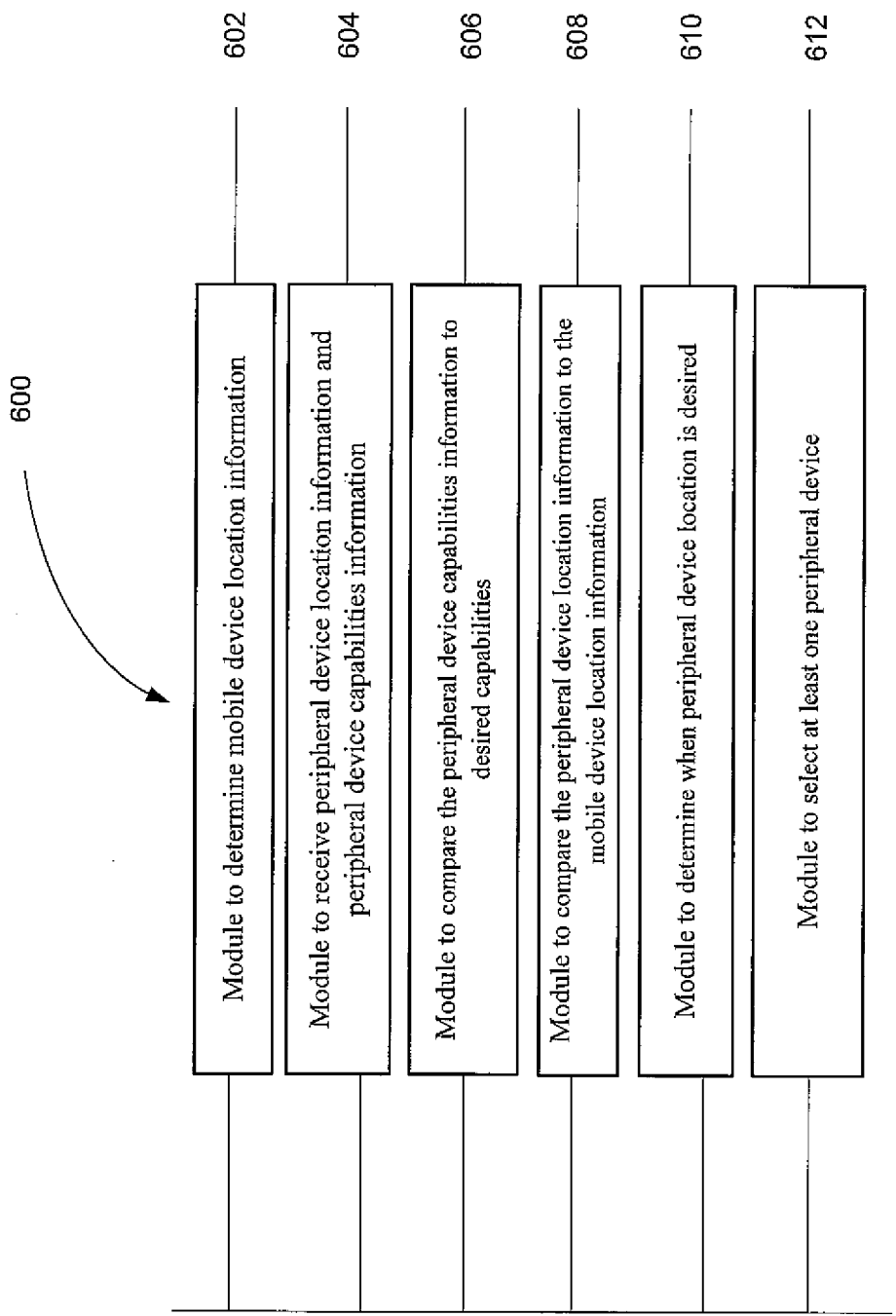
FIG. 6 is a block diagram illustrating components for peripheral device location and connection by mobile devices according to one aspect of the present disclosure.

FIG. 6 shows a design of an apparatus 600 for a mobile device. The apparatus 600 includes a module 602 to determine mobile device location information. The apparatus 600 also includes a module 604 to receive peripheral device location information and peripheral device capabilities information. The apparatus 600 also includes a module 606 to compare the peripheral device capabilities information to desired capabilities. The apparatus 600 also includes a module 608 to compare the peripheral device location information to the mobile device location information. The apparatus 600 also includes a module 610 to determine when the peripheral device location is desired. The apparatus 600 also includes a module 612 to select at least one peripheral device. The modules in FIG. 6 may be processors, electronics devices, hardware devices, electronics components, logical circuits, memories, software codes, firmware codes, etc., or any combination thereof.

An apparatus may include means for determining mobile device location information. The means may include components instructions 48, location server 26, position location receiver 31, storage medium 32, cellular transceiver 35, bus 34, storage medium 32, satellite 20, base station 22, antenna 122, transceiver 121, interface 120, bus 101, SPS receiver 155, interface 150, antenna 158, peripheral device 46, peripheral device server 240, and module 602. The apparatus may include means for receiving peripheral device location information and peripheral device capabilities information. The means may include components instructions 48, cellular transceiver 35, bus 34, storage medium 32, satellite 20, base station 22, antenna 122, transceiver 121, interface 120, bus 101, peripheral device 46, peripheral device server 240, and module 604. The apparatus may include means for comparing the peripheral device capabilities information to desired capabilities. The means may include components data processor 30, storage medium 32, instructions 48, processor 112, peripheral device server 240, peripheral device 46, and module 606. The apparatus may include means for comparing the peripheral device location information to the mobile device location information. The means may include components data processor 30, storage medium 32, instructions 48, processor 112, and module 608. The apparatus may include means for determining when the peripheral device location is desired. The means may include components data processor 30, storage medium 32, instructions 48, processor 112, and module 610. The apparatus may include means for selecting at least one peripheral device. The means may include components data processor 30, storage medium 32, instructions 48, processor 112, and module 612. In another aspect, the aforementioned means may be a module or any apparatus configured to perform the functions recited by the aforementioned means.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

The invention claimed is:

1. A method of identifying peripheral devices to a mobile device, the method being implemented by the mobile device and comprising:
    determining mobile device location measurements or identifiers;
    receiving peripheral device location measurements or identifiers and an identification of peripheral device capabilities; and
    selecting at least one peripheral device based at least in part on an estimated distance for a user to traverse between a first estimated location of a user of the mobile device and a second estimated location of the at least one peripheral device based, at least in part, on:
        one or more locations of one or more known physical boundaries or barriers indicated on one or more accessed maps, the at least one peripheral device comprising at least one printer or projector; and
        a comparison of the peripheral device location measurements or identifiers to the mobile device location measurements or identifiers based, at least in part, on a traversable path to the mobile device.

2. The method of claim 1 further comprising establishing a connection between the mobile device and the selected at least one peripheral device.

3. The method of claim 1 wherein the mobile device location measurements or identifiers and the peripheral device location measurements or identifiers comprise access point profiles.

4. The method of claim 1 in which the comparison of the peripheral device location measurements or identifiers to the mobile device location measurements or identifiers comprises determining peripheral device beacon measurements or identifiers received by the mobile device.

5. The method of claim 1 in which the comparison of the peripheral device location measurements or identifiers to the mobile device location information is based at least in part on mobile device beacon measurements or identifiers received by at least one peripheral device.

6. The method of claim 1 in which the traversable path accounts for indoor barriers.

7. The method of claim 1 in which the peripheral device location measurements or identifiers is obtained from a server.

8. The method of claim 1 in which the selected at least one peripheral device is not a closest peripheral device to the mobile device.

9. The method of claim 1 in which the selected at least one peripheral device is determined based on an indoor location of the mobile device.

10. The method of claim 1 in which the selected at least one peripheral device is determined based on a history of previous peripheral device connections.

11. The method of claim 1 in which the selected at least one peripheral device is determined based on at least one of a mobile device configuration, a user indicated peripheral preference, or compatibility.

12. A mobile device comprising an apparatus for identifying peripheral devices to the mobile device, the apparatus comprising:
   means for determining mobile device location measurements or identifiers;
   means for receiving peripheral device location measurements or identifiers and an identification of peripheral device capabilities; and
   means for selecting at least one peripheral device based at least in part on an estimated distance for a user to traverse between a first estimated location of a user of the mobile device and a second estimated location of the at least one peripheral device based, at least in part, on:
      one or more locations of one or more known physical boundaries or barriers indicated on one or more accessed maps, the at least one peripheral device comprising at least one printer or projector; and
      a comparison of the peripheral device location measurements or identifiers to the mobile device location measurements or identifiers based, at least in part, on a traversable path to the mobile device.

13. An article comprising a computer program product for identifying peripheral devices to the mobile device, the computer program product comprising:
   a non-transitory computer-readable medium having program code recorded thereon, the program code being executable by one or more processors to:
   determine mobile device location measurements or identifiers;
   process received peripheral device location measurements or identifiers and an identification of peripheral device capabilities;
   select at least one peripheral device based at least in part on an estimated distance for a user to traverse between a first estimated location of a user of the mobile device and a second estimated location of the at least one peripheral device based, at least in part, on:
      one or more locations of one or more known physical boundaries or barriers indicated on one or more accessed maps, the at least one peripheral device comprising at least one printer or projector; and
      a comparison of the peripheral device location measurements or identifiers to the mobile device location measurements or identifiers based, at least in part, on a traversable path to the mobile device.

14. A mobile device comprising an apparatus for identifying peripheral devices to the mobile device, the apparatus comprising:
   at least one processor; and
   a memory coupled to the at least one processor, the at least one processor to:
   determine mobile device location measurements or identifiers;
   process received peripheral device location measurements or identifiers and an identification of peripheral device capabilities;
   select at least one peripheral device based at least in part on an estimated distance for a user to traverse between a first estimated location of a user of the mobile device and a second estimated location of the at least one peripheral device based, at least in part, on:
      one or more locations of one or more known physical boundaries or barriers indicated on one or more accessed maps, the at least one peripheral device comprising at least one printer or projector; and
      a comparison of the peripheral device location measurements or identifiers to the mobile device location measurements or identifiers based, at least in part, on a traversable path to the mobile device.

15. The apparatus of claim 14 in which the at least one processor is further configured to establish a connection between a mobile device and the selected at least one peripheral device.

16. The apparatus of claim 14 in which the mobile device location measurements or identifiers and peripheral device location measurements or identifiers comprise access point profiles.

17. The apparatus of claim 14 in which the at least one processor is further configured to determine peripheral device beacon measurements or identifiers received by the mobile device.

18. The apparatus of claim 14 in which the at least one processor is further configured to determine mobile device beacon measurements or identifiers received by at least one peripheral device.

19. The apparatus of claim 14 in which the traversable path accounts for indoor barriers.

20. The apparatus of claim 14 in which the peripheral device location measurements or identifiers is obtained from a server.

21. The apparatus of claim 14 in which the selected at least one peripheral device is not a closest peripheral device to the mobile device.

22. The apparatus of claim 14 in which the selected at least one peripheral device is determined based on an indoor location of the mobile device.

23. The apparatus of claim 14 in which the selected at least one peripheral device is determined based on a history of previous peripheral device connections.

24. The apparatus of claim 14 in which the selected at least one peripheral device is determined based on at least one of a mobile device configuration, a user indicated peripheral preference, or compatibility.

25. The method of claim 1, wherein the selecting at least one peripheral device is further based at least in part on:
   a comparison of the identification of peripheral device capabilities to desired capabilities, and a comparison of the peripheral device location measurements or identifiers to the mobile device measurements or identifiers.

26. The method of claim 1, where the first estimated location of the user of the mobile device is estimated based, at least in part, on the mobile device location measurements or identifiers.

* * * * *